April 20, 1937. H. C. TAYLOR 2,078,040
BOTTLE CAPPING APPARATUS
Filed April 9, 1935 11 Sheets-Sheet 1
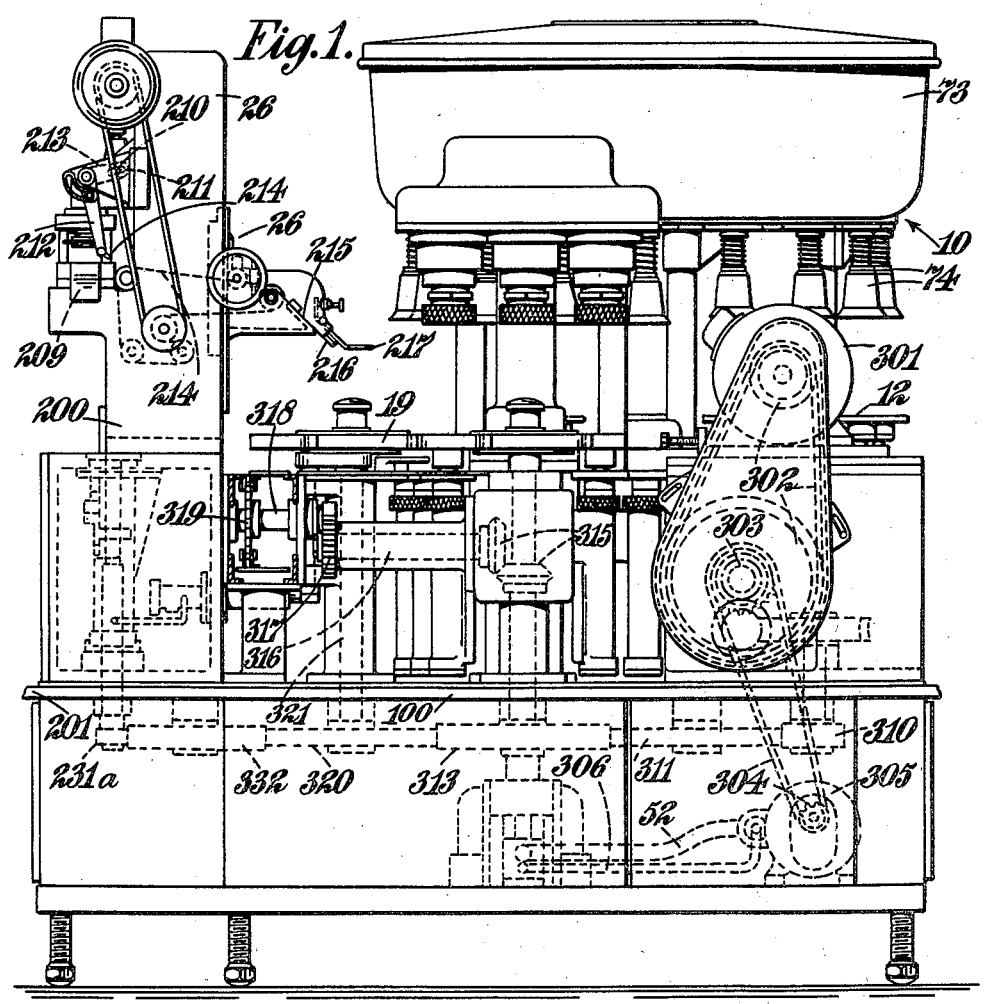
INVENTOR
Herbert Cyril Taylor
by his attys
Byrnes, Stebbins & Blenko

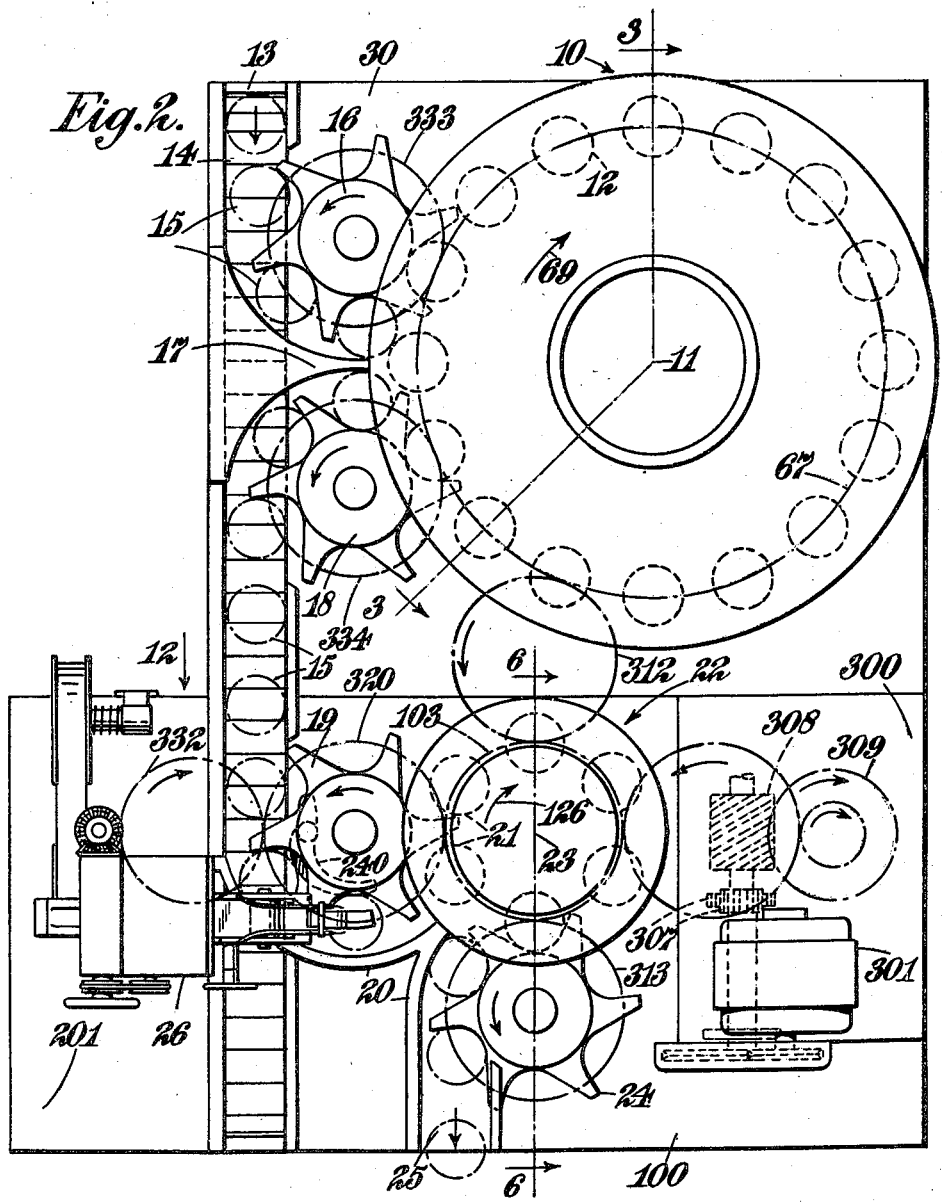

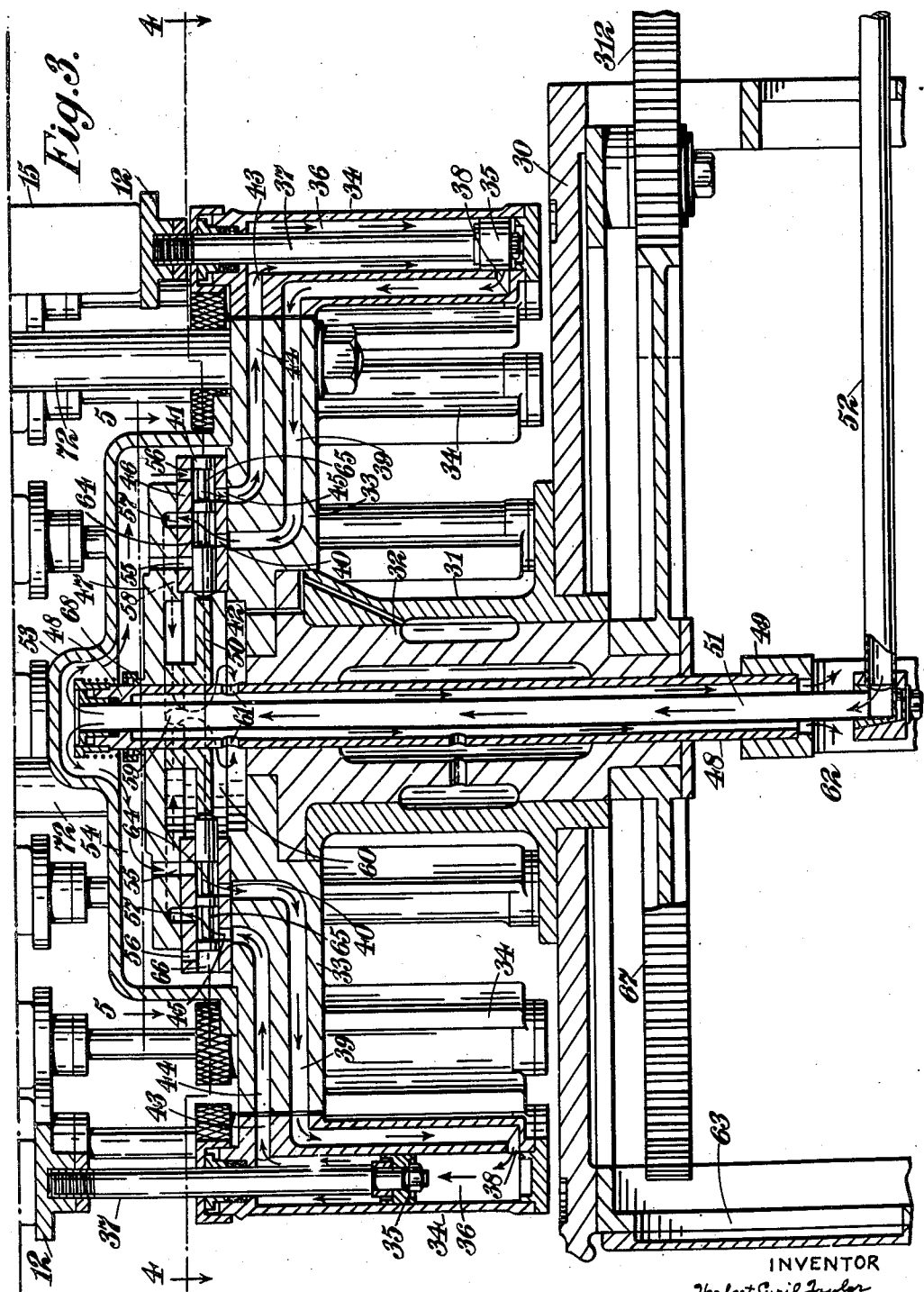

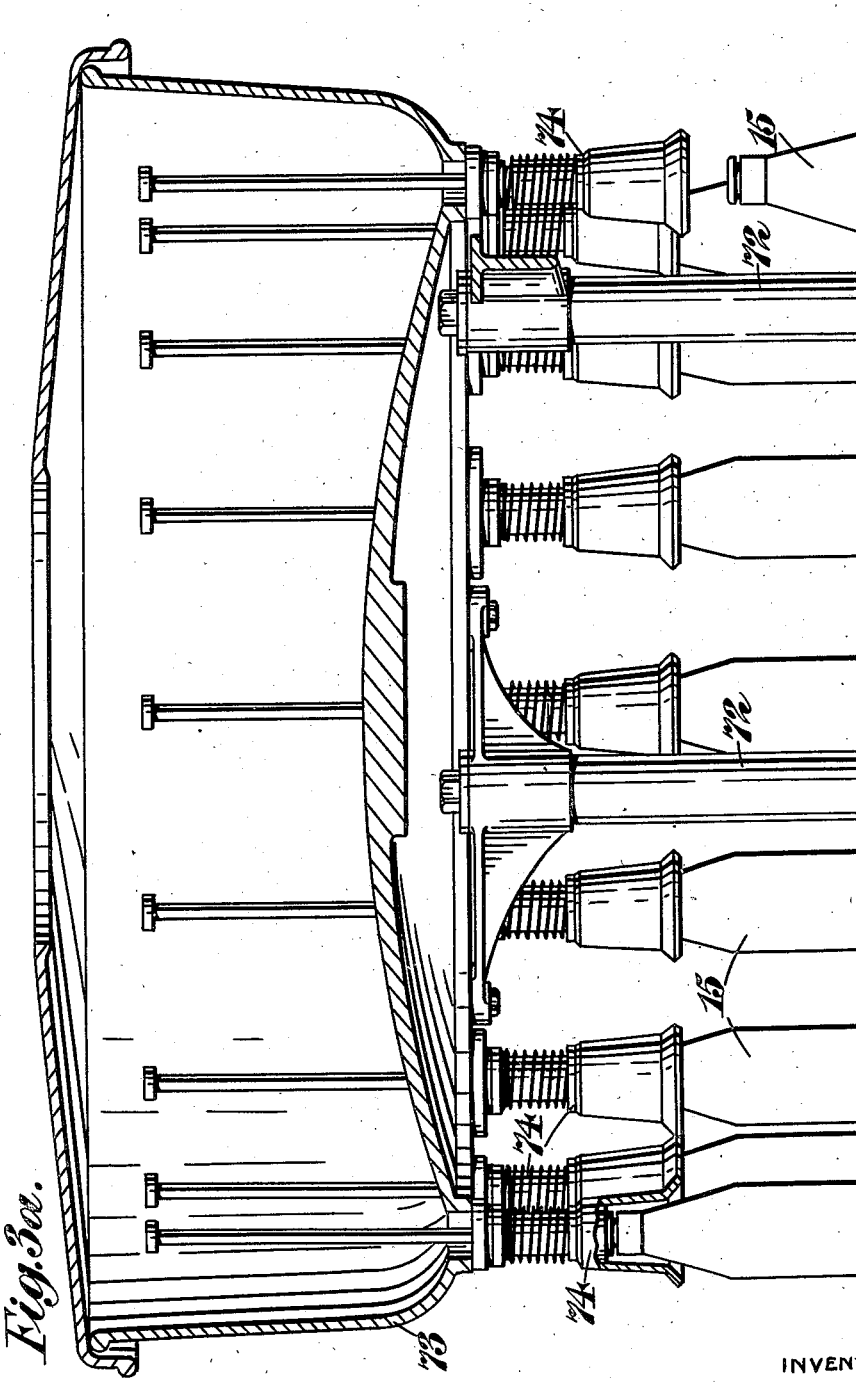

April 20, 1937.    H. C. TAYLOR    2,078,040
BOTTLE CAPPING APPARATUS
Filed April 9, 1935    11 Sheets-Sheet 5

INVENTOR
Herbert Cyril Taylor
by his atty's
Byrnes, Stebbins & Blenko

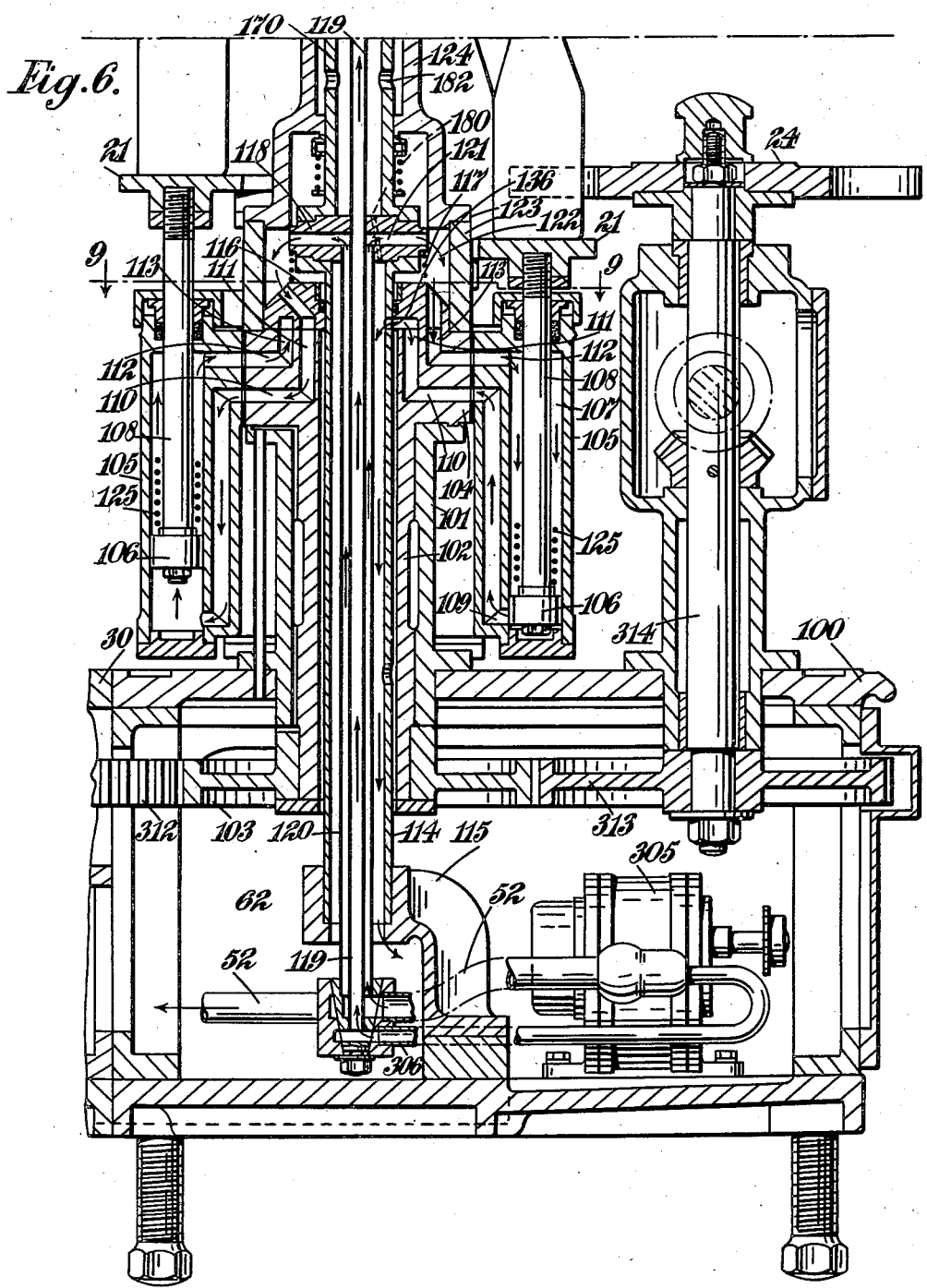

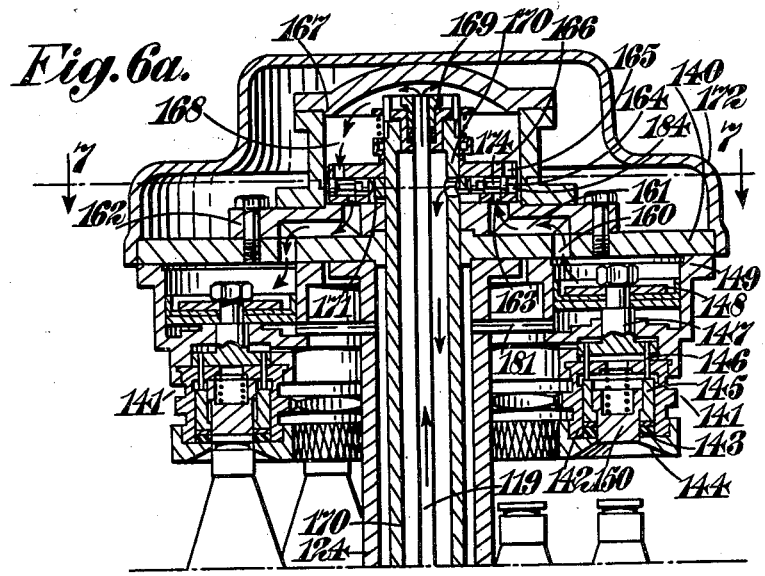
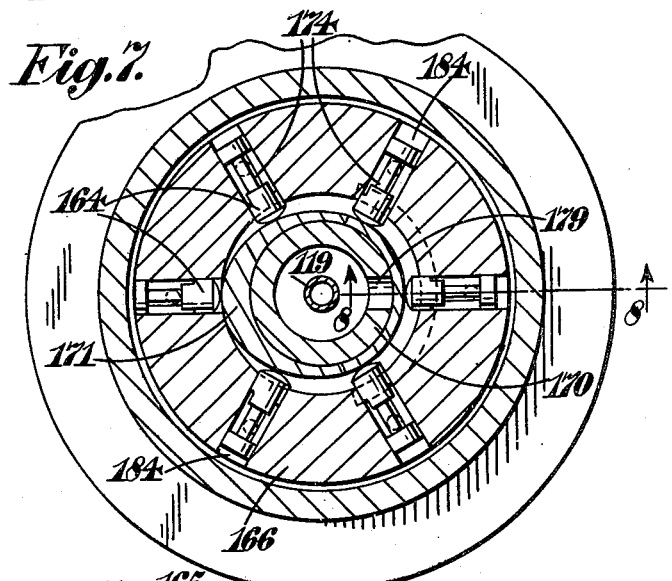
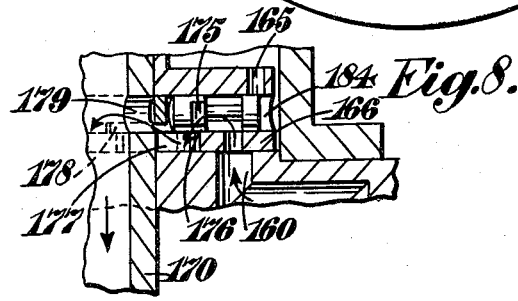

April 20, 1937.  H. C. TAYLOR  2,078,040
BOTTLE CAPPING APPARATUS
Filed April 9, 1935   11 Sheets-Sheet 8
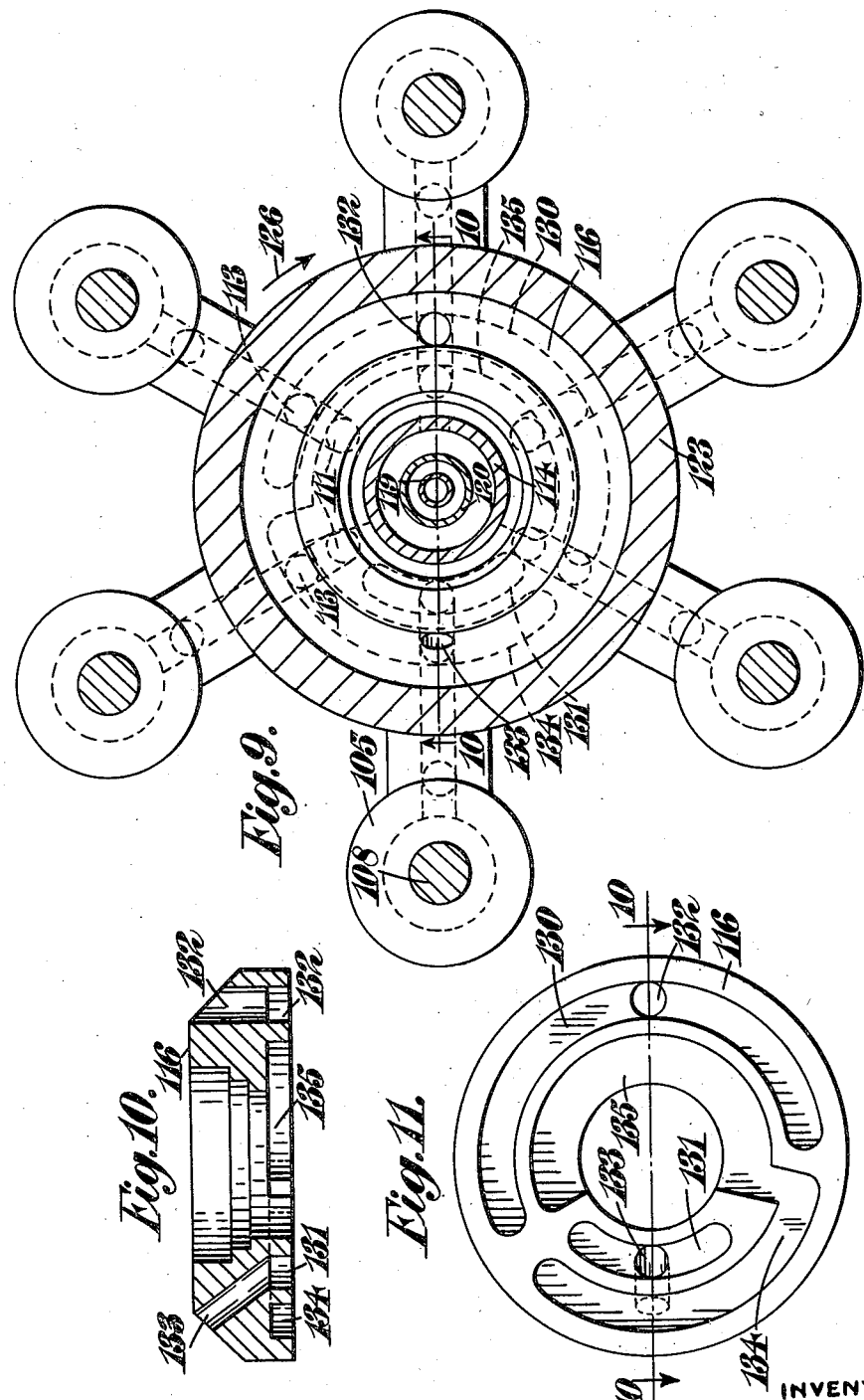
INVENTOR
Herbert Cyril Taylor
by his attys
Byrnes Stebbins & Blenko

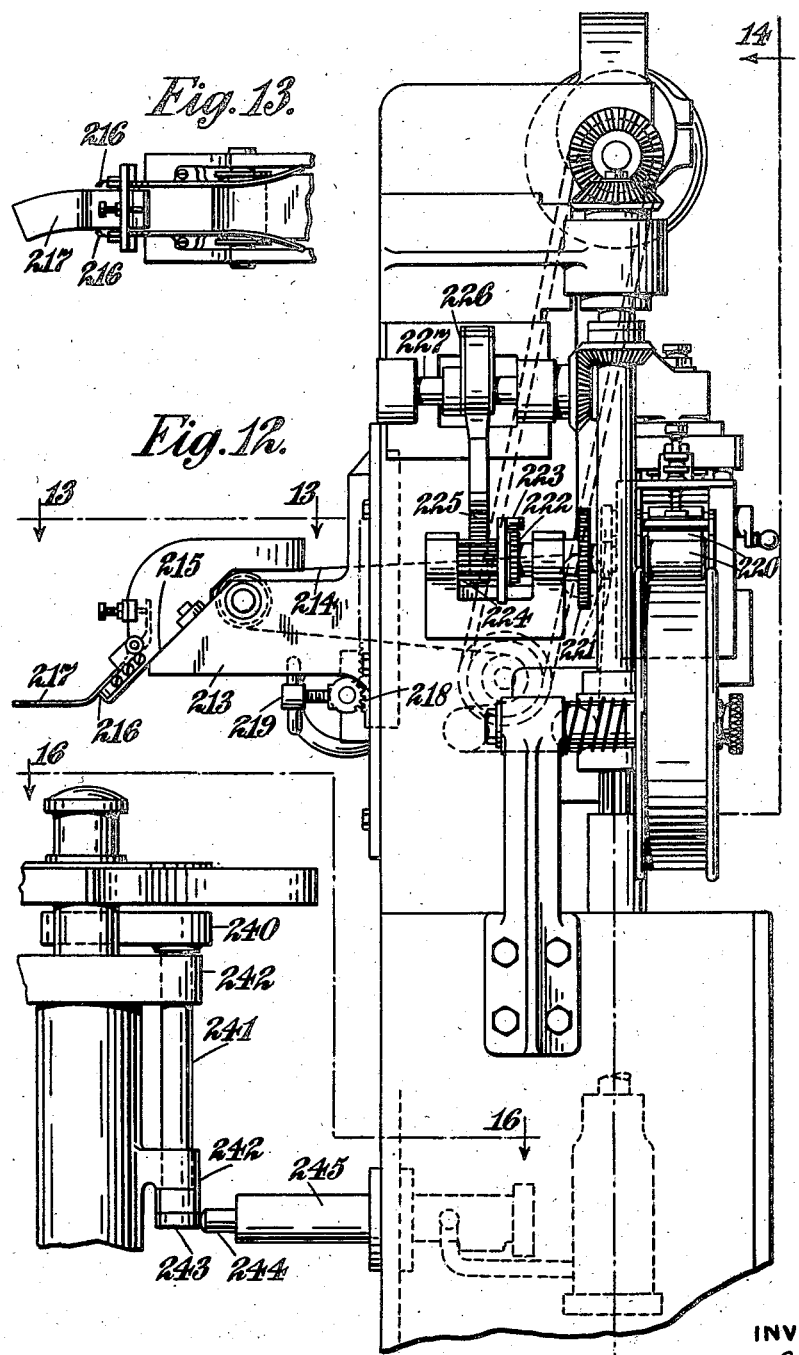

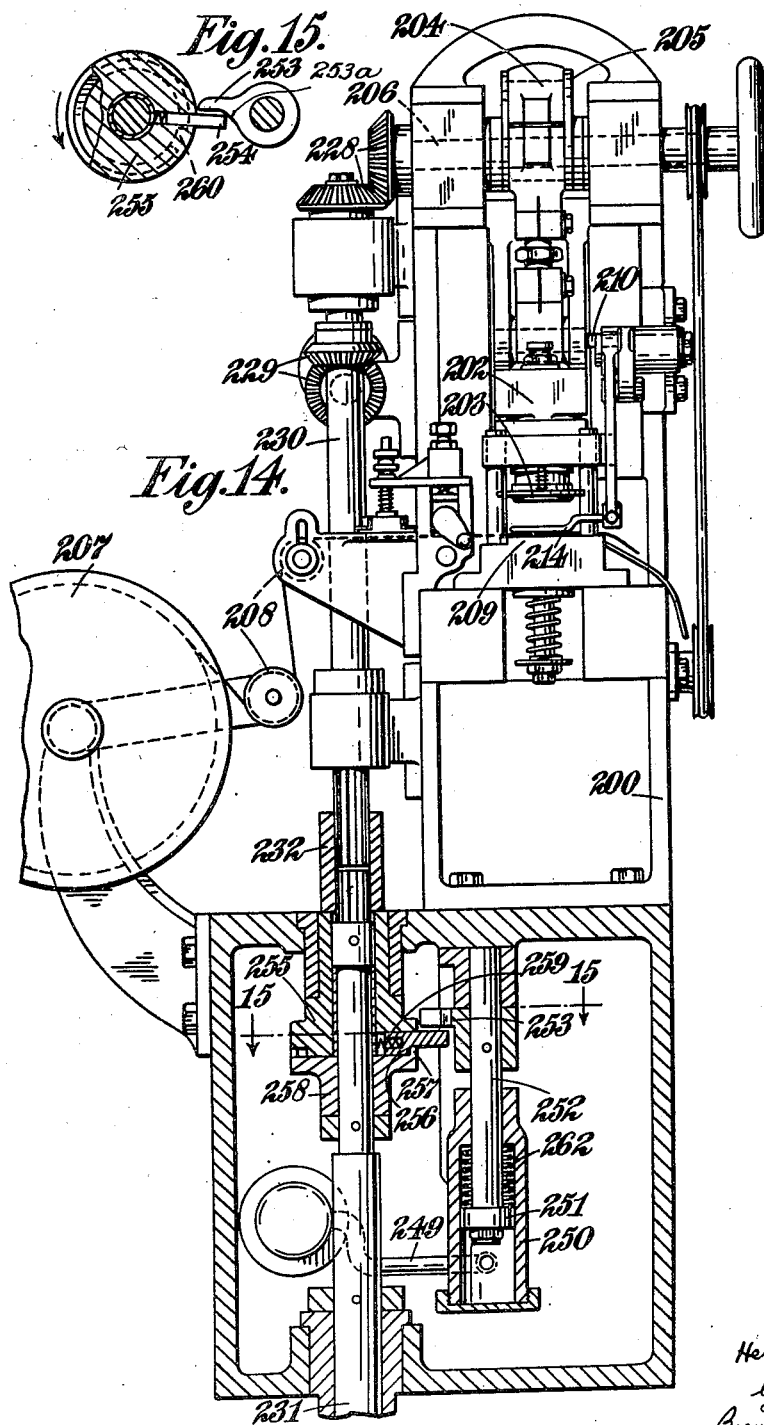

April 20, 1937.  H. C. TAYLOR  2,078,040
BOTTLE CAPPING APPARATUS
Filed April 9, 1935   11 Sheets-Sheet 11
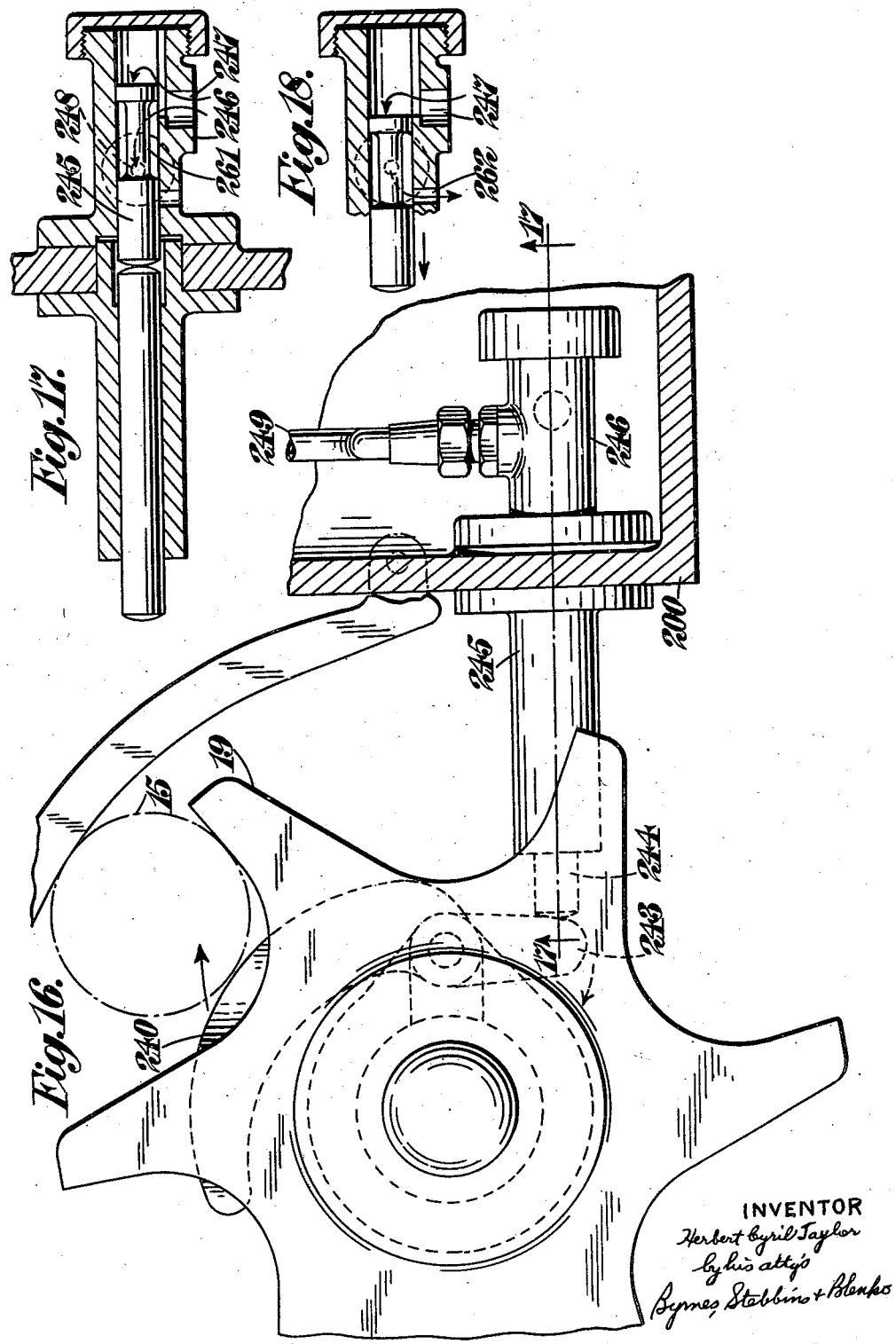
INVENTOR
Herbert Cyril Taylor
by his atty's
Byrnes, Stebbins & Blenko Patented Apr. 20, 1937

2,078,040

UNITED STATES PATENT OFFICE 2,078,040

BOTTLE CAPPING APPARATUS

Herbert Cyril Taylor, London, England, assignor to U. D. Engineering Company Limited, London, England, a British company Application April 9, 1935, Serial No. 15,409
In Great Britain July 9, 1934

6 Claims. (Cl. 226—85)

This invention relates to improvements in or relating to filling and/or capping apparatus for bottles and like containers and is concerned with such apparatus of the type in which the bottles and other containers are fed on to a plurality of pedestals arranged around a rotatable carrier and during the rotation of the carrier the pedestals are raised to lift the bottles successively for the filling or capping operation. For filling the bottles, the carrier supports a container for the charging liquid and a plurality of valve control nozzles, one above each pedestal. For capping the bottles, the carrier supports a plurality of capping devices, one above each pedestal. The raising of the bottles brings them into co-operation with the nozzles or capping devices as the case may be.

Usually in apparatus of this type the pedestals are raised by means of a fixed cam and one object of the present invention is to provide improved means for raising and lowering the pedestals, and a feature of the invention consists in providing the apparatus of the type referred to, fluid-operating means for automatically lifting the pedestals carrying the bottles or the like during the rotation of the carrier, for filling and/or capping the bottles.

The invention further comprises a plurality of piston and cylinder devices one for each pedestal and valve means controlling the flow of operating fluid to and from each cylinder. In one form there is provided a valve member rotatable with the carrier and having at least one port communicating with each cylinder and a co-operating stationary valve member for directing the operating fluid to each cylinder in succession. Preferably, the rotatable valve member forms one wall of the chamber containing the operating fluid under pressure and the co-operating stationary valve member is located in this chamber and is urged into fluid-tight contact with the rotatable valve member by the fluid pressure in the chamber.

In another form of apparatus according to the invention the valve means aforesaid comprises a valve member rotatable with the carrier and having a plurality of valve chambers one for each cylinder and connected thereto by at least one fluid passage, a distributing valve in each valve chamber and a fixed cam operating the distributing valves successively as the carrier rotates. Preferably, the valve chambers are arranged radially about the axis of rotation of the carrier and the distributing valves are maintained in contact with the fixed cam by means of the operating fluid pressure at the other ends of the valve.

Preferably, according to the invention the piston and cylinder devices are of the double-acting type and the valve means serves automatically to apply operating fluid to opposite ends of each cylinder alternately to lift and lower each pedestal during rotation of the carrier. Preferably, the pedestal is directly mounted upon the piston rod of the piston and cylinder device associated therewith.

In the application of apparatus as aforesaid for bottle or like filling purposes there is provided a container for the substance to be delivered into the bottles mounted above the pedestals and having a plurality of valve-controlled discharge openings, one immediately from each pedestal, which valve-controlled openings are automatically opened by the bottle as it is raised by a fluid operated pedestal during rotation of the carrier.

In the application of the apparatus according to the invention for the purpose of capping the bottles or the like there is provided capping mechanism comprising a plurality of capping devices, one for each pedestal, to seal a cap on to the mouth of a bottle when raised by a fluid operated pedestal during the rotation of the carrier. A feature of the invention consists in providing a fluid operated piston and cylinder device for operating each capping device and valve means as hereinbefore referred to for controlling the supply of operating fluid under pressure to the piston and cylinder devices in succession as the carrier rotates.

According to another feature of the invention there is provided in combination with the cap-applying apparatus aforesaid means for feeding the bottles or the like to the cap-applying apparatus, cap-forming mechanism and means automatically feeding the formed caps to the bottles as they are transferred to the cap-applying apparatus. Preferably, the cap-forming mechanism comprises means to feed the formed caps to take up an inclined position such that a bottle carried along to the cap-applying apparatus engages by its rim the edge of the cap to draw the latter on to the mouth of the bottle. A movable flap is preferably provided to smooth the cap on the top of the bottle before the bottle reaches the cap-applying apparatus.

A further feature of the invention consists in providing means automatically to control the operation of the cap-forming apparatus according to the bottles being conveyed to the cap-applying apparatus for the purpose of ensuring that the caps are only formed in such quantity as required by the bottles being fed through the apparatus.

In one specific form of the apparatus the filling apparatus, cap-applying apparatus and the cap-forming mechanism are formed as units assembled together with a driving gear to form a unit mechanism for the complete operation of filling and capping bottles or the like. By this construction, however, each unit of the apparatus is adapted for use separately.

One specific embodiment of the invention comprising both bottle filling apparatus and bottle capping apparatus together with cap-forming mechanism is shown by way of example in the accompanying drawings in which:—

Figure 1 is an elevation, and

Figure 2 is a plan of the complete apparatus.

Figure 4:
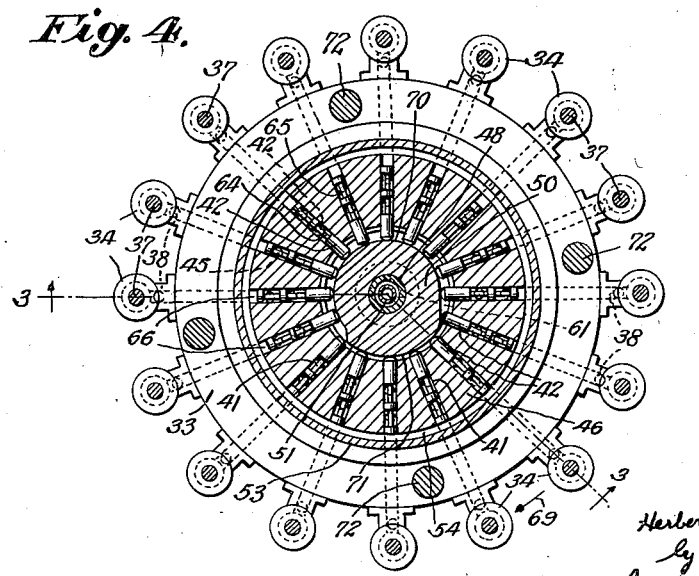

Figures 3 and 3a together form a cross-sectional view of the bottle filling apparatus taken on line 3—3 of Figures 2 and 4.

Figure 4 is a section on line 4—4 of Figure 3.

Figure 5:
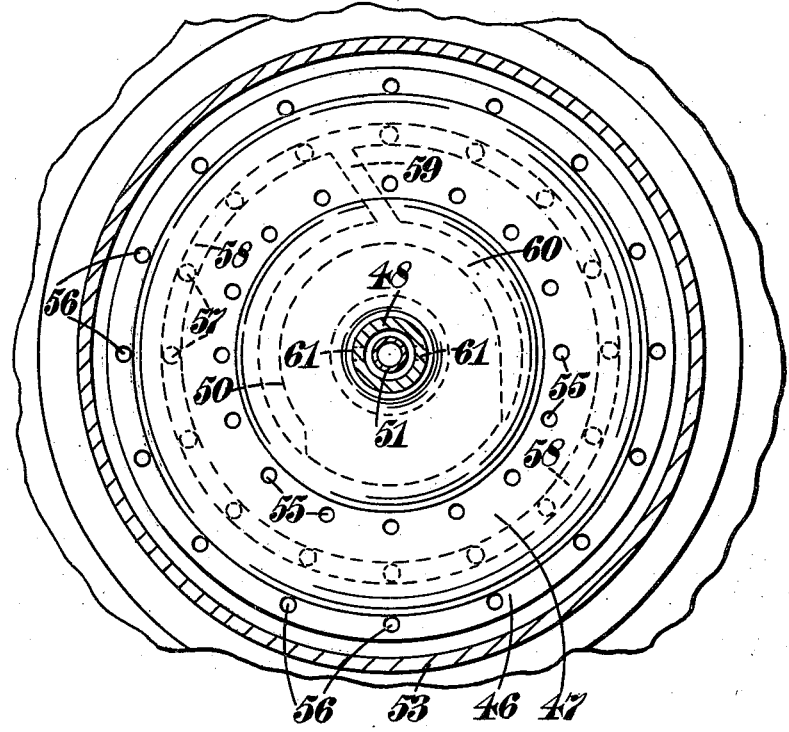

Figure 5 is a section on line 5—5 of Figure 3.

Figures 6 and 6a together form a cross-sectional view of the bottle capping apparatus taken on line 6—6 of Figure 2.

Figure 7 is an enlarged section on line 7—7 of Figure 6a.

Figure 8 is a section on line 8—8 of Figure 7.

Figure 9 is an enlarged section on line 9—9 of Figure 6.

Figure 10 is a section on line 10—10 of Figures 9 and 11.

Figure 11 is an underneath view of the valve member shown in Figures 9 and 10.

Figure 12 is an elevation of cap-forming mechanism looking in the direction of the arrow 12 in Figure 2.

Figure 13 is a plan view taken from line 13—13 of Figure 12.

Figure 14 is an elevation partly in section on line 14—14 of Figure 12.

Figure 15 is a section on line 15—15 of Figure 14, and Figure 16 is an enlarged detail view of control means for the cap-forming mechanism.

Figures 17 and 18 are sections on line 17—17 of Figure 16.

Like references indicate like parts in the several figures of the drawings.

Referring more especially to Figures 1 and 2 of the drawings, the bottle filling apparatus indicated generally at 10 is for the most part rotatable about a vertical axis 11 and comprises a plurality of pedestals 12 equidistant from the axis 11. The bottles are fed in at 13 on to an endless conveyor 14 the bottles being shown at 15. The bottles 15 are fed from the conveyor 14 on to the pedestals 12 of the filling apparatus by means of a rotatable star wheel 16 in conjunction with a fixed guide 17. The bottles are carried round on the pedestals 12 and after the filling operation has been completed the bottles are transferred back again to the conveyor 14 by means of another star wheel 18 operating in conjunction with a fixed guide 17. The bottles 15 are further carried along by the conveyor 14 to a star wheel 19 which in conjunction with a fixed guide 20 transfers filled bottles to pedestals 21 of the capping apparatus generally indicated at 22. This capping apparatus is for the most part rotatable about a vertical axis 23 as in the case of the filling apparatus. The bottles are thus carried round on the pedestals 21 for the capping operation and are then removed from the capping apparatus by means of a star wheel 24 operating in conjunction with the fixed guide 20 to discharge the filled and capped bottles from the machine at 25. A cap-forming mechanism 26 is provided to produce and to feed caps to the filled bottles as they are conveyed to the capping apparatus 22.

*Filling apparatus*

Referring particularly to Figures 2, 3a, 4 and 5, mounted on a base 30 there is provided a fixed tubular bearing member 31 in which a pillar 32 is rotatably mounted. This pillar has secured to it a carrier plate 33 supporting at its periphery a plurality of double-acting piston and cylinder devices 34 each associated with a pedestal 12.

Each of the piston and cylinder devices 34 comprises a piston 35 movable in a vertical cylinder 36 and mounted on a piston rod 37 extending through a gland at the upper end of the cylinder and directly carrying the pedestal 12. The lower end of each cylinder 36 has a port 38 communicating by means of a passageway 39 in the plate 33 with a port 40 leading to a cylinder 41 of a distributing valve 42. Similarly at the upper end of each of the cylinders 36 there is provided a port 43 communicating by means of a passageway 44 in the plate 33 with a port 45 also communicating with the cylinder 41. The plurality of cylinders 41 are radially formed in an annular member 46 secured to the carrier plate 33 and rotatable therewith.

Above the valve member 46 there is provided a plate 47 rotatable with the valve member 46 and mounted with a fluid-tight joint 68 on a stationary vertical tube 48 supported at its lower end in a bracket 49. On this tube there is mounted a stationary cam 50 (Figures 3 and 5) engaging at its periphery the inner end of each of the distributing valves 42.

Within the stationary tube 48 and spaced therefrom there is provided an inner tube 51 communicating at the bottom with a supply pipe 52 for operating liquid under pressure and open at the top into a chamber 54 above the valve member 46 and enclosed by a cover plate 53. Communicating with this chamber 54 there are provided for each valve chamber 41 inlet ports 55 and 56 respectively. Each of the valve chambers 41 also has an exhaust port 57 communicating with an annular passage 58 (Figure 5) in the plate 47 which annular passage communicates by means of a cross-duct 59 with a chamber 60 within the annular valve member 46 which is connected by means of ports 61 and the space between the inner and outer tubes 48 and 51 with a reservoir 62 formed by a housing 63 upon which the base 30 is mounted.

Each of the distributing valves 42 has two reduced portions 64 and 65 respectively and the outer end of each valve chamber is open at 66 for communication with the chamber 54 for the purpose described below.

In operation fluid such as oil under pressure is applied by means of the pipe 52 and the piston and cylinder devices 34 mounted on the pillar 32 are rotated by means of a gear wheel 67 mounted on the lower end of this pillar and driven as hereinafter described and in the direction indicated by the arrow 69 in Figures 2 and 4.

The fluid under pressure supplied through the inner tube 51 to the chamber 54 operates through the open end 66 of each of the valve chambers 41 to maintain the valve 42 in contact with the operating cam 50. This cam comprises two principal cylindrical portions 70 and 71 and corresponding respectively to the opposite limits of the range of movement of the distributing valves 42 controlled by this cam.

At the inner position of each distributing valve 42 as determined by the portion 70 of the cam 50 the fluid under pressure in the chamber 54 is applied through the port 55 as shown at the left hand side of Figure 3 and around the reduced portion 64 of the distributing valve to the port 40 and from thence through the passage 39 and port 38 to the lower end of the cylinder 36 thus operating on the piston 35 to raise the pedestal 12. Exhaust fluid from the upper end of the cylinder is released through the port 43 and passage 44 to the port 45 of the valve chamber and from thence around the reduced portion 65 of the valve to the exhaust port 57, and finally flows away through the passages 58 and 59 to the space 60 and through the holes 61 to the inner side of the tube 48 down to the reservoir 62.

In the outer position of each distributing valve determined by the portion 71 of the cam the fluid under pressure in the chamber 54 is applied through port 56, as shown in the right hand side of Figure 3 around the reduced portion 65 of the valve to the port 45 and from thence through the passage 44 to the port 43 of the cylinder 36 thus operating on the piston 35 to lower the pedestal 12. At the same time fluid exhausted from the lower part of cylinder 36 passes out through port 38 to passage 39 and port 40 around the reduced portion 64 of the distributing valve and through the exhaust port 57.

Thus as the filling apparatus is rotated the pedestals are raised and lowered at predetermined points in the rotary motion of the apparatus and determined by the cam 50.

Supported above the pedestals on pillars 72 mounted upon carrier plate 33 and rotatable therewith there is provided a container 73 (Figures 1, 2 and 3a) for the liquid, such as milk with which the bottles are to be filled and having a plurality of delivery valves 74 one corresponding to each of the pedestals 12. These valves 74 are spring closed and are automatically opened by the engagement therewith of the mouth of the bottle raised on the supporting pedestal 12 in order automatically to deliver a required quantity of milk into the bottle. Thus the bottles delivered on to the pedestal 12 of the filling apparatus are carried round therewith and as the rotary motion proceeds they are raised by the pedestals 12 to co-operate with the valves 74 to receive the required quantity of milk and are then lowered again by means of the pedestals ready to be discharged from the filling apparatus.

*Capping apparatus*

The capping apparatus 26 (see Figures 1, 2 and 6 to 8) is mounted upon a base 100 conveniently flush with the base 30 of the filling apparatus. The base 100 carries a vertical bearing 101 in which a pillar 102 is rotatably mounted and is driven by means of a gear wheel 103 mounted on its lower end. The pedestal 102 is formed with a flange 104 at its upper end constituting a carrier for a plurality of piston and cylinder devices 105 secured to the periphery of this flange. Each of these piston and cylinder devices comprises a piston 106 movable in a vertical cylinder 107 and carried upon a piston rod 108 extending through a gland at the upper end of the cylinder and supporting a pedestal 21 for receiving a bottle. Each of the cylinders 107 has a port 109 at the lower end communicating by means of a passage 110 in the flange 104 with a port 111 in the upper face thereof. Similarly at the upper end of the cylinder 107 there is a port 112 communicating with a port 113 at the upper face of the flange 104. Thus there are two series of circularly arranged ports 111 and 113 in the top face of the flange 104 as shown in Figure 9.

Within the pillar 102 there is provided a stationary tube 114 carried at its lower end in a bracket 115. Non-rotatably mounted on the upper end of this tube 114 there is provided a valve member 116, and a spring 117 interposed between this valve member and a disc 118 secured to the upper end of the tube 114 serves to ensure that the valve member is maintained in close contact with the upper surface of the flange 104.

Within the tube 114 there is provided two pipes an inner pipe 119 and an outer pipe 120 and operating fluid under pressure is supplied from pipe 52 to the space between the inner and outer pipes 119 and 120 and passes through radial passages 121 in the disc 118 to a chamber 122 above the valve member 116 which chamber is closed by the lower enlarged end 123 of a column supporting capping devices as hereinafter described with reference to Figure 6a.

The valve member 116 has on its underside (see Figure 11) a groove 130 of circular form extending through an angle somewhat greater than 180° and arranged to overlie ports 113 and another groove 131 of circular form extending through a smaller angle and arranged to overlie ports 111. These grooves communicate by means of passages 132 and 133 respectively to the space 122 above the valve member. Other grooves 134 and 135 also arranged to overlie ports 113 and 111 respectively are interconnected and form an exhaust passage communicating with an opening 136 in the tube 114.

In operation the piston and cylinder devices 105 are carried around by rotation of the pillar 102 and operating fluid under pressure is supplied to the chamber 122 from the supply pipe 52. As a port 113 comes beneath the groove 131 in the valve member 116 the fluid under pressure is supplied through this groove, port 111, the passage 110 and port 109 to the lower end of the cylinder 107 as shown at the left hand side of Figure 6 and moves the piston 106 upwardly thus raising the pedestal and a bottle thereon. Simultaneously fluid exhausted from the upper end of the cylinder flows through the ports 112 and 113 and then through groove 134 in the valve member to the space between tube 114 and pipe 120 down into the reservoir 62. A helical spring 125 is provided on each piston rod 108 in order to retard the motion of the piston near the upper limit of its stroke.

When a port 113 comes into register with the groove 130 in the valve member 116, as shown at the right hand side of Figure 6, fluid under pressure is supplied through this groove and the ports 112 and 113 to the upper end of the cylinder 107 to return the piston and lower pedestal associated therewith. Simultaneously the port 111 corresponding to this cylinder comes into register with the groove 135 in the valve member 116 so that fluid in the lower part of the cylinder 107 is exhausted through the port 109, passage 110 and the port 111 through this groove 135.

Thus the pedestals 21 are raised and lowered as the capping apparatus is rotated in the direction of the arrow 126 in Figures 2 and 9 and by reason of the comparative length of the grooves 130 and 131 in the valve member the pedestals are maintained in the upper position while moving through an angle of about 90° and are maintained in the lower position for substantially the remainder of each revolution.

Mounted on the standard 124 above the pedestal 21 there is provided mechanism for sealing caps on the bottles when raised by the pedestals. The caps employed are of the known construction formed of aluminium or other thin metal foil, and consist of a main circular part with a peripheral depending flange. As shown in Figure 6a there is carried upon the standard 124 a plate 140 to the periphery of which there is secured a plurality of cap-applying devices 141 one corresponding to each of the pedestals 21. These capping devices are of the known kind in which the flange part of a cap as aforesaid previously placed over the mouth of the bottle is pressed tightly around the rim of the bottle to form a light seal. Each capping device comprises a tubular housing 142, a deformable rubber ring 143 therein and a retaining member 144 for the rubber ring. A tubular pressure member 145 is connected by means of pins 146 to a piston rod 147 secured to a piston 148 vertically movable in a cylinder 149 rigidly connected with the housing 142 and secured to the plate 140. Within the housing 142 and the deformable ring 143 there is provided a spring pressed plunger 150. As the bottle is raised by means of a pedestal 21 a cap previously applied to the mouth of a bottle engages with the plunger 150 which serves to hold the cap in position as the bottle continues to rise to bring the rim of the bottle within the deformable ring 143 as shown at the left-hand side of Figure 6a. When the bottle is in this position the ring 143 is deformed by downward movement of the pressure member 145 effected by means of the associated piston and cylinder device 148, 149 in order to press the cap tightly over the mouth of the bottle.

The piston and cylinder devices 148, 149 are of single acting type and the upper end of each cylinder communicates with a port 160 in the plate 140 and connected by means of a passage 161 in a superimposed plate 162 with a port 163 in a valve chamber 184 of a distributing valve 164. An inlet port 165 is provided at the other side of the valve chamber. The several valve chambers 184 are radially formed in an annular member 166 fixed with respect to the plate 162 and enclosed by a cover 167 to provide a chamber 168 for fluid under pressure applied thereto by means of the central pipe 119. The upper end of this pipe is sealed by means of a gland 169 in a stationary tube 170 within the standard 174 and seated at its lower end on the disc 118. On this tube 170 a cam 171 is non-rotatably mounted and engages with the inner end of each of the distributing valves 164 (see Figure 7) the other end of these valves being subject to the pressure of the fluid in the chamber 168 in order to maintain the valves in contact with the cam. A cover 172 is provided for the whole of the apparatus and is mounted on the plate 140.

In the inoperative condition of each of the cap-applying devices the distributing valve 164 is at the inner position and the piston 148 is urged to its uppermost position by means of the resilient ring 143.

At the inner position of the valve 164 the corresponding port 163 registers with a reduced portion 174 of the valve and an exhaust passage for fluid previously admitted to the cylinder 149 is provided by means of flats 175 and 176 on the valve (see Figure 8), a recess 177 in the valve member 166, a recess 178 in the cam 171 and an opening 179 in the wall of the tube 170. The exhaust fluid thus passes down the tube 170 which communicates by means of a passage 180 in the disc 118 to the space for exhaust fluid from the piston and cylinder devices operating the pedestals 21 within the tube 114 so that it returns to the reservoir 62 in the base of the apparatus.

In the outer position of each distributing valve 164 fluid under pressure from the chamber 168 is supplied through the port 165, and through the port 163 around the reduced portion 174 of the valve and by way of the passage 161 and port 160 to the corresponding cylinder 149 to depress the piston 148 in order to perform the cap-fixing operation.

Thus by the rotation of the apparatus the bottles are carried round on the pedestals 21 and during this rotary movement the bottles are raised by the pedestals and lowered again after the caps have been affixed. When in the raised position the bottles are inserted into the corresponding capping devices which are carried round with the pedestals, and while the bottles are in this position the capping devices 141 are operated under the control of the cam 171 to effect the cap-fixing operation. The cam 171 is therefore so shaped as to render each capping device operative only for a short period commencing after a bottle has been fully raised on the corresponding pedestal 21 and terminating before the pedestal 21 is lowered again. For each cylinder 149 there is provided a passage 181 for leakage of oil communicating with the interior of the standard 124 and through holes 182 into the exhaust passage within the tube 170.

Cap-forming mechanism

The caps for the bottles are formed and automatically fed to the mouths of the bottles as they are fed on to the pedestals 21 of the capping apparatus. The cap-forming mechanism generally indicated at 26 is carried upon a framework 200 built up on a base 201 arranged adjacent to the base 22 of the capping apparatus. In the upper part of the framework 200 (see Figures 12 to 15) there is provided a reciprocating tool head 202 carrying a press tool 203 for forming the caps and pivotally connected to a strap 204 of an eccentric 205 carried on a rotatable shaft 206. The caps are formed from metal foil strip fed step by step from a reel 207 around guide rollers 208 and between the press-tool 203 and the co-operating tool 209 so that the caps are formed by successive downward movements of the tool 203.

A pin 210 carried by the slide 202 engages in a slot 211 in one arm of a bell-crank lever 212 (see Figure 1) pivotally mounted on a bracket 213 and at the extremity of the other arm of the bell-crank lever 212 there is provided a finger 214. The arrangement is such that the lever 212 is oscillated by the slide 202 so as to engage by means of the finger 214 each cap produced by the tool 203 and deflect it on to an endless conveyor 214. By means of this conveyor the caps are fed to inclined chute 215 down which the caps slide to a position in which the cap is lightly retained by resilient fingers 216 (Figures 12 and 13) in an inclined position with the flange turned downwardly ready for application to the mouth of the bottle. The chute 215 is arranged over the path of the bottles as they are carried round by means of the star wheel 19 as shown in Figure 2 and at such a height that each bottle in its movement will engage the lower part of the flange of the cap retained by the fingers 216 so as to draw the cap away from the fingers 216 on to the mouth of the bottle. A pivoted flap 217 is provided to smooth down the cap properly in position on the top of the bottles so that the bottle is then ready for transfer to the capping apparatus in which the cap is properly fixed in position to form the required seal. The bracket 213 is mounted for vertical adjustment on the frame 200 by means of a rack and pinion 218 (Figure 12) and locking screw 219 so as to adapt the cap feeding mechanism to bottles of different sizes.

The metal foil from which the caps are formed is fed forward step-by-step by means of rollers 220 in Figure 12 which rollers are driven through gearing 221 by means of a ratchet wheel 222. Co-operating with this ratchet wheel there is provided a pawl 223 carried on a pinion 224 which latter is in mesh with a rack 225 reciprocated by means of an eccentric 226 on a rotatable shaft 227. The shaft 206 operating the press tool and the shaft 227 operating the feeding means for the metal foil are driven in synchronism through bevel gearing indicated at 228 and 229 respectively by a vertical shaft 230. This shaft 230 is connected by a coupling 232 to a drive shaft 231 having a driving pinion 231a (Figure 1) at its lower end. The cap-forming mechanism is driven through the pinion 231a in synchronism with the rotary movement of the filling and cap-applying apparatus so that a cap is formed for each of or full complement of bottles in the apparatus.

It is necessary to interrupt the forming of caps should there be a gap in the succession of bottles fed into the apparatus because otherwise there would be an accumulation of caps which would upset the satisfactory operation of the apparatus. In order to prevent such an accumulation of caps means is provided to control the cap-forming mechanism by means of the bottles actually fed to the cap-applying apparatus. As shown in Figures 2, 12 and 16 a curved lever 240 is mounted on a rotatable shaft 241 carried in its fixed bracket 242 (Figure 12). At the lower end of the shaft 241 there is an arm 243 (Figure 16) engaging with one end of a plunger 244 slidable in a housing 245 on the frame 200. The other end of the rod 244 engages with a valve 245 slidable in a valve housing 246 to which fluid under pressure is applied through a port 247 by means of a pipe connection (not shown) to the feed pipe 52. An outlet port 248 from the valve chamber is connected by means of a pipe 249 to the lower end of a cylinder 250 (Figure 14) containing a piston 251 and a piston rod 252 connected thereto extending out from the top of the cylinder. On the piston rod 252 there is mounted a deflecting member 253 adapted to be moved into the path of a radial member 254 carried in a boss 255 rigid upon the shaft 230. The radial member 254 has a shoulder 256 normally engaging, under the action of a spring 259, an annular lip 257 on a boss 258 secured to the shaft 231. The lip 257 has an inward projection 260 (Figure 15) which normally engages with the radial member 254 so that rotation of the shaft 231 is also imparted to the shaft 230.

In operation so long as bottles are continually being fed round by the star wheel 19 the curved lever 240 is maintained in the position shown in Figure 16 and the valve 48 is consequently maintained in its left-hand position as shown in Figure 17 by means of the fluid pressure acting upon the free end of the valve member 245. The fluid under pressure is also applied through this port 247 and around the reduced portion 261 of the valve to the port 248 and from thence through pipe 249 to the cylinder 250 in order to hold the piston 251 in its uppermost position against the action of a return spring 262. In this position the deflector 253 is clear of the radial member 254 and the drive for the cap-forming apparatus continues uninterrupted. Should a bottle be absent from one of the spaces between projections of the star wheel 19 then the curved lever 240 is permitted to swing outwardly and thereby to permit the valve 248 to move to the left in Figure 17 to the position shown in Figure 18 in which the fluid under pressure applied through the port 247 is only active upon the end of the valve and does not reach the pipe 249. Simultaneously the pipe 249 is connected by means of a valve with an exhaust port 262, thus permitting the piston 251 to fall under the action of the spring 262. By this movement the deflecting member 253 is brought into the path of the radial member 254 which is engaged by the inclined surface 253a and is moved inwardly against the action of the spring 259 so that the shoulder 256 becomes free of the projection 260 so that the shaft 231 continues to rotate without driving the shaft 230 and the cam forming mechanism temporarily comes to a standstill. In this manner the cap-forming mechanism is controlled automatically to produce caps only when there are bottles going through the machine to receive such caps.

Referring more especially to Figures 1 and 2 the base members 30, 100 and 201 of the several units of the apparatus are conveniently assembled on the housing 63 which also constitutes a reservoir for the operating fluid, such as oil. Also mounted on this housing there is provided a driving unit 300 comprising an electric motor 301 driving, through an endless V belt and pulleys 302, a main shaft 303. The shaft 303 drives through the chain and sprocket gearing 304, a pump 305 supplying the operating fluid under pressure by way of the pipe 52. The pump also supplies fluid at a reduced pressure by means of pipe 306 to the lower end of the inner tube 119 of the capping apparatus as shown in Figures 6 and 6a for the operation of the capping devices as it is preferred to employ somewhat lower pressure for this purpose.

The shaft 303 also drives through sprocket gearing 307 a worm 308 meshing with a worm wheel 309 mounted on a vertical spindle having at its lower end within the housing 63 a pinion 310. This pinion 310 drives the gear 103 of the capping apparatus through an intermediate gear wheel 311. The gear wheel 103 drives the gear wheel 67 of the filling apparatus through an intermediate gear 312 and is also directly in mesh with a gear wheel 313 driving a spindle 314 on which the star wheel 24 is mounted. This spindle 314 also serves to drive the conveyor 14 through a bevel gearing 315 a horizontal shaft 316 coupled by gearing 317 driving a spindle 318 carrying a sprocket 319 (Figure 1) engaging with and operating the conveyor 14. The gear wheel 103 of the cap-applying mechanism is also in mesh with a gear wheel 320 (Figure 1) on a rotatable driving spindle 321 supporting the star wheel 19 and the gear 320 in turn drives the pinion 231a of the cap-forming mechanism through an intermediate gear 332.

The gear wheel 67 of the filling apparatus is also directly in mesh with gear wheels 333 and 334 for driving the star wheels 16 and 18 respectively.

Thus it will be understood that by means of the complete apparatus as hereinbefore described the empty bottles fed in at the charging position at 13 are conveyed through the apparatus and are automatically filled, for instance with milk, sealed with a cap and delivered at the discharge end 25 without any manual operation being required, the caps also being formed and fed automatically to the bottles. Apart from the rotary drive for the filling apparatus, capping apparatus and the cap-forming mechanism, the whole of the apparatus is controlled hydraulically with the advantage that the apparatus is comparatively quiet in operation and that the possibility of a breakdown due to the breakage of a bottle is very largely eliminated as the pressure applied at any point is limited by the fluid pressure used for the operation of the apparatus.

In the specific example hereinbefore described the complete apparatus is built up of a plurality of units and any one or more of these units may be employed separately. Thus, for example, the filling apparatus, may be employed alone or again the cap-forming mechanism may be omitted and the caps may in this instance be applied either by hand or automatically from a magazine.

Furthermore it will be understood that the invention is not restricted to the details of construction described in the foregoing specific embodiment and for instance in either the filling apparatus or the capping apparatus the valve control means may consist of a disc valve or a cam operated series of individual distributing valves as desired.

I claim:—

1. In apparatus of the class described, container manipulating means comprising the combination of a fixed central supporting column having passageways for fluid therein, a carrier rotatable about said column comprising passageways cooperating with the passageways in the supporting column, a plurality of pedestals distributed around the carrier and movable therewith, means for feeding the containers onto the pedestals as the carrier rotates, cooperating means mounted on the carrier above the pedestals and rotatable with the carrier, a plurality of piston and cylinder devices connected with the passageways in the carrier each mounted on the carrier and operatively connected to one of said pedestals and a valve member rotatable with said carrier and having at least one port communicating with each cylinder, which valve member forms one wall of a chamber on said carrier and containing operating fluid under pressure, a cooperating valve member fixed to the supporting column and located in said chamber and urged into fluid tight contact with the rotatable valve member by the fluid pressure in the chamber, and a plurality of ports in said stationary valve member for directing fluid through said rotatable valve member to each cylinder in succession to raise the associated pedestal and container thereon into operative relation with said manipulating means as the carrier is rotated.

2. Apparatus for applying caps to containers comprising a fixed central supporting column, a carrier rotatable about said column, a plurality of pedestals distributed around the carrier and movable therewith, capping devices mounted on the carrier above the pedestals and rotatable with the carrier, means for feeding containers onto the pedestals as the carrier is rotated and fluid operative means automatically lifting the pedestals to bring the containers into operative position in relation to the capping devices and operating said capping devices to apply a cap to a container when in the raised position comprising walls in said central column forming a passageway for fluid, walls in said carrier forming passageways cooperating with the passageway in said column and a valve member rotatable with said carrier and having a plurality of valve chambers, one cooperating with each passageway, a plurality of distributing valves, one in each of said valve chambers, and a cam fixed to the supporting column operating said distributing valves successively as the carrier rotates.

3. Apparatus for applying caps to containers comprising a fixed central supporting column, a carrier rotatable about said column, a plurality of pedestals distributed around the carrier and movable therewith, capping devices mounted on the carrier above the pedestals and rotatable with the carrier, means for feeding containers onto the pedestals as the carrier is rotated and fluid-operative means automatically lifting the pedestals to bring the containers into operative position in relation to the capping devices and operating said capping devices to apply a cap to a container when in the raised position, comprising walls in said central column forming a passageway for fluid, walls in said carrier forming passageways cooperating with the passageway in said column and a valve member rotatable with the carrier and having a plurality of valve chambers, one cooperating with each passageway, which valve chambers are radially arranged about the axis of rotation of the carrier, distributing valves movable in said valve chambers, a cam fixed to said supporting column cooperating with one end of each of said distributing valves successively as the carrier rotates, and means for applying fluid under pressure on the other end of each of said valves to maintain said valves in contact with the said cam.

4. Apparatus for applying caps to containers comprising a fixed central supporting column, a carrier rotatable about said column, a plurality of pedestals distributed around the carrier and movable therewith, means for feeding the containers onto the pedestals as the carrier rotates, capping devices mounted on the carrier above the pedestals and rotatable with the carrier, a plurality of piston and cylinder devices each mounted on the carrier and operatively connected to one of said pedestals, walls in said central column forming a passageway for fluid, walls in said carrier forming a group of passageways connecting said central passage with said capping devices, further walls in said carrier forming a second group of passageways connecting said central passageway with said piston and cylinder devices, valve means for controlling the flow of fluid to said capping devices, and additional valve means for controlling the flow of fluid to said piston and cylinder devices.

5. Apparatus according to claim 4 wherein one of said valve means is constituted by a valve member rotatable with said carrier and having a plurality of valve chambers, one cooperating with each passageway in one of said groups, a plurality of distributing valves, one in each of said valve chambers, and a cam fixed to the supporting column operating said distributing valves successively as the carrier rotates.

6. Apparatus according to claim 4 wherein one of said valve means is constituted by a valve member rotatable with the carrier and having a plurality of valve chambers, one cooperating with each passageway in one of said groups, which valve chambers are radially arranged about the axis of rotation of the carrier, distributing valves movable in said valve chambers, a cam fixed to said supporting column cooperating with one end of each of said distributing valves successively as the carrier rotates, and means for applying fluid under pressure on the other end of each of said valves to maintain said valves in contact with said cam.

HERBERT CYRIL TAYLOR.